United States Patent Office 3,273,411
Patented Sept. 20, 1966

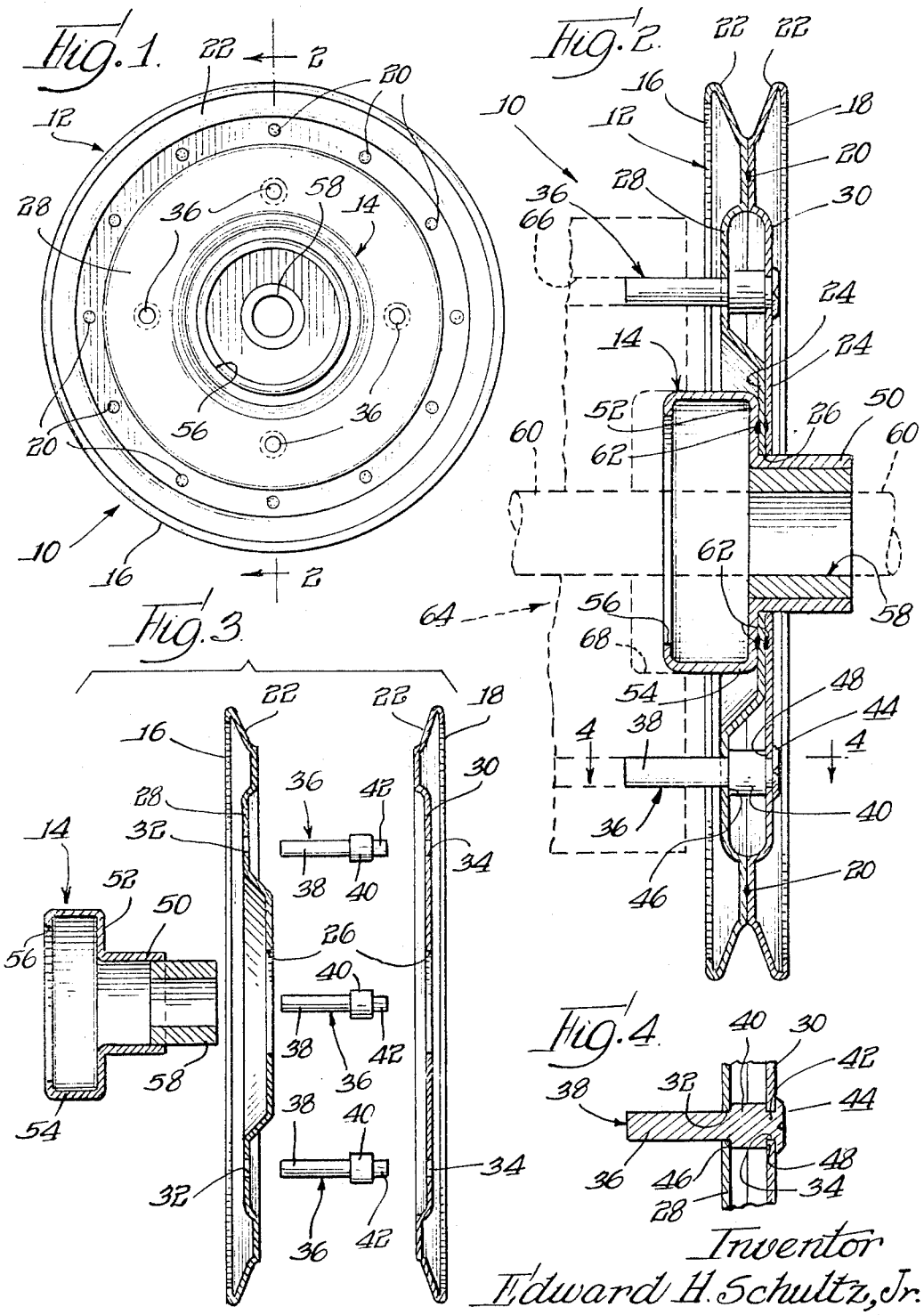

3,273,411
FABRICATED SHEET METAL SHEAVE
Edward H. Schultz, Jr., Glencoe, Ill., assignor to The Nagel-Chase Manufacturing Company, Chicago, Ill., a corporation of Illinois
Filed Nov. 4, 1964, Ser. No. 408,816
5 Claims. (Cl. 74—230.4)

This invention relates generally to sheaves and more particularly to the type of sheave that is adapted to rotate freely on a central shaft and that is driven from an annular region disposed radially intermediate the shaft and a peripheral rim.

In the past, sheaves of the type described have comprised a single thickness of sheet metal shaped to form the intermediate annular region and folded at its edge to develop the rim. A thick-walled hub has been used to fasten a collar-defining cup member to the center of the unit and to receive a sintered bronze sleeve bearing. Arcuately arranged, axially extending drive pins have been fastened to the annular region to align the cup member with a cooperating clutch and to receive rotative force from the clutch. In such an arrangement, the drive pins are subject to tearing loose from the main wall of the sheaves unless that wall is held precisely transverse the shaft without any possibility of wobble. This requirement has, in turn, necessitated a comparatively massive and rigid hub. In order to compensate for the substantial wall thickness of the hub, resort has been taken to a highly effective but expensive sintered bronze bearing.

The present invention departs from the inflexible specifications of the prior art and takes as a principal object the provision of a stronger, more serviceable unit that can be produced at a lower cost.

A more general object of the invention is to provide a new and improved sheave arrangement.

These and other objects and features of the invention will become more apparent from a consideration of the following descriptions.

A structure in accord with the invention includes a pulley body having at a place intermediate its peripheral rim and its central aperture an annular region that defines a box section. Force-transmitting pins are fastened to this box section at arcuately spaced locations to extend axially outwardly to receive rotative force. A one-piece hub is received in the central aperture of the pulley body, and this hub includes a cylindrical portion received in the central aperture, a flange portion radiating from the cylindrical portion to abut one face of the pulley body and a collar portion extending axially from the flange portion to act as a mounting site for a cooperating structure. A sleeve bearing is fixed in the cylindrical portion of the hub. In accord with one feature of the invention, the force-transmitting pins include radially enlarged portions disposed in the box section of the pulley body for strength purposes; and in accord with another feature of the invention the sleeve bearing is fabricated of economical, sintered iron.

In order that the principles of the invention may be readily understood, a single embodiment thereof, but to which the application is not to be restricted, is shown in the accompanying drawing wherein:

FIG. 1 is a side elevational view of a sheave arrangement constructed in compliance with the invention;

FIG. 2 is an enlarged, central sectional view of the sheave arrangement of FIG. 1, being a view taken substantially along the line 2—2 of that figure, a cooperating shaft and clutch being suggested in broken lines;

FIG. 3 is an intermediate scale, exploded, sectional view in side elevation showing the components of the sheave arrangement of FIGS. 1 and 2; and FIG. 4 is a view taken along the line 4—4 of FIG. 2.

Referring now in detail to the drawing, specifically to FIGS. 1 and 2, a sheave arrangement indicated generally by the reference numeral 10 is seen to include a pulley body 12 and a hub member 14. These two components are fashioned from a suitable sheet material such as either carbon or stainless steel so that economical stamping and drawing techniques may be employed in their fabrication. In compliance with the invention, the pulley body 12 is fashioned from two sheet material members 16 and 18 which are fastened together by suitable means such as equally arcuately spaced weldments 20. The sheet material members 16 and 18 have oppositely deflected outer edge portions 22 which flare to define a peripheral, belt-receiving rim. These two sheet material members also are arranged with abutting inner edge portions 24 which define a circular central aperture 26. In compliance with the features of the invention, the sheet material members 16 and 18 include oppositely bulged annular regions 28 and 30 respectively, and these oppositely bulged regions define a hollow box section generally encircling the aperture 26. This box section promotes considerable strength and rigidity in the pulley body 12.

The box section which is defined by the oppositely bulged annular regions 28 and 30 is perforated with a number of axially aligned holes 32 and 34, the holes 32 being disposed in the bulged region 28 and the holes 34 being situated in the bulged region 30 as is well shown in FIG. 3. The holes 32 and 34 are equally arcuately spaced and are adapted to receive force-transmitting pins 36. Continuing with reference to FIGS. 2–4, each of the pins 36 includes an elongate portion 38 that extends axially beyond the face of sheet material member 16, a radially enlarged portion 40 which is situated between the sheet material members 16 and 18, and a short stem portion 42 which is riveted over to form a head 44 shown in FIG. 2. The elongate portion 38 extends through a hole 32 and the stem portion 42 extends through the aligned hole 34 to be exposed for the riveting operation. It will be observed, with particular reference to FIGS. 2 and 4, that the radially enlarged portion 40 of each pin 36 defines oppositely facing shoulders 46 and 48 which abuttingly engage flat surfaces of the sheet material members 16 and 18 respectively. So positioned and arranged, the pins 36 are braced by the box section of bulged regions 28 and 30; and the box section itself is supported against possible distortion by the force transmitted to the pulley body 12 by the pins 36.

The hub member 14 comprises a cylindrical portion 50, an annular flange portion 52 radiating from the cylindrical portion 50 and a collar portion 54 which extends axially from the flange portion 52, collar portion 54 terminating in an inturned lip 56. The one-piece hub member 14 is advantageously fabricated by such procedures as drawing and metal spinning. The flange portion 52 is provided to abut the sheet material member 16 radially outwardly of the aperture 26, as is shown in FIG. 2;

and the collar portion 54 is adapted to act as a mounting site for a cooperating structure. Because the cylindrical portion 52 is, like the remainder of the hub member 14, fabricated from sheet material, it presents a relatively thin wall; and in compliance with the features of the invention, a comparatively thick-walled sleeve bearing 58 is pressed into the inner bore of the cylindrical portion 50 for use in journaling the sheave arrangement 10 on a shaft, such as shaft 60. Due to the fact that the cylindrical portion 50 is comparatively thin-walled, the sleeve bearing 58 may be comparatively thick-walled while still accommodating a shaft of a given diameter. Accordingly and in compliance with the feature of the invention, the sleeve bearing 58 is fashioned from economical, sintered iron rather than the more expensive, sintered bronze.

Assembly of the components of sheave arrangement 10 is suggested in FIG. 3. Conveniently, the pins 36 are first fitted to either of the sheet material members 16 and 18 whereupon the remaining sheet material member is disposed in place in fitting engagement with the pins. The resultant subassembly may then be fastened together by formation of the weldments 20 and the heads 44 on the pins 36. If desired, the pins may be fastened initially to the sheet material member 18 by formation of the heads 44, subsequently situating the sheet material member 16 in place and then welding. The hub member 14 is then assembled to the pulley body with the cylindrical portion 50 slidably entering the aperture 26. Suitable means are then employed to secure the hub member to the pulley body, and double weldments 62, best seen in FIG. 2, may be utilized in this regard. Finally, the sleeve bearing 58 is pressed into place and the unit is cleaned and finished.

In use, a shaft, such as the shaft 60 will be slidably and rotatably disposed in the sleeve bearing 58 coaxially with the hub member 14 and the pulley body 12. A clutch member such as the clutch member 64 will also be disposed on the shaft 60, clutch member 64 including bores 66 for slidably receiving the pins 36 and a central bore 68 for slidably receiving the collar portion 54 of the hub member 14, clutch member 64 transmitting rotate force to the sheave arrangement 10 by its non-rotatable engagement with the pins 36.

The doubled wall construction of the pulley body 12, the annular box section formed in the pulley body and the shouldered character of the drive pins 36 cooperate to produce a strong rigid unit in which the drive pins are securely mounted without need for providing additional strength and rigidity in conjunction with the cooperating shaft. By thus reducing the strength requirements at the shaft, a one-piece hub of formed sheet metal can be employed, concomitantly eliminating the cost of appreciable amounts of material and expensive fabricating operations. Moreover, such a hub will define a comparatively thin-walled cylinder in which a comparatively thick-walled sleeve bearing may be situated without enlarging the outside diameter of the hub or reducing the diameter of the cooperating shaft. Hence, the sleeve bearing may be fabricated from inexpensive, sintered iron. It will thus be apparent that the present invention circumvents the specifications of the prior art which were described hereinabove and, at the same time, provides a strong, serviceable, inexpensive unit.

The specific example herein shown and described is to be considered as being primarily illustrative. Various changes in structure will, no doubt, occur to those skilled in the art; and such changes are to be understood as forming a part of this invention insofar as they fall within the spirit and scope of the appended claims.

The invention is claimed as follows:

1. A sheave arrangement comprising: first and second sheet material members having outer edge portions defining a peripheral rim, inner edge portions defining a central aperture and annular regions intermediate said rim and said aperture cooperating to define a box section, a plurality of axially aligned hole means perforating said members at arcuately spaced positions on said box section; and a force-transmitting pin means fastened to said box section at each of said hole means, including an elongate portion extending axially beyond the face of one of said members to be engaged by motive means, said pin means further including a radially enlarged portion disposed between said members and having at least one shoulder engaging a said member radially outwardly of the corresponding hole means to brace said pin means against torsional forces and prevent distortion by the engaging motive means.

2. A sheave arrangement comprising: first and second sheet material members having outer edge portions defining a peripheral rim, inner edge portions defining a central aperture and annular regions intermediate said rim and said aperture cooperating to define a box section, a plurality of axially aligned hole means perforating said members at arcuately spaced positions on said box section; a force-transmitting pin means fastened to said box section at each of said hole means, including an elongate portion extending axially beyond the face of one of said members to be engaged by motive means, said pin means further including a radially enlarged portion disposed between said members and having at least one shoulder engaging a said member radially outwardly of the corresponding hole means to brace said pin means against torsional forces and prevent distortion by the engaging motive means; sheet material hub means including a cylindrical portion received in said aperture, a flange portion radiating from said cylindrical portion to abut one of said members radially outwardly of said aperture and a collar portion extending axially from said flange portion to act as a mounting site for cooperating structure means; and a thick-walled sleeve bearing fixed in said cylindrical portion.

3. A sheave arrangement comprising: first and second sheet metal members having oppositely deflected outer edge portions defining a peripheral rim, abutting inner edge portions defining a central aperture and oppositely bulged annular regions intermediate said rim and said aperture cooperating to define a hollow box section, a plurality of axially aligned hole means perforating said members at arcuately spaced positions on said box section; a force-transmitting pin means fastened to said box section at each of said hole means, including an elongate portion extending axially beyond the face of one of said members to be engaged by motive means, said pin means further including a radially enlarged portion disposed between said members and having at least one shoulder engaging a said member radially outwardly of the corresponding hole means to brace said pin means against torsional forces and to prevent distortion by the engaging means; drawn sheet metal hub means, including a cylindrical portion received in said aperture, a flange portion radiating from said cylindrical portion to abut one of said members radially outwardly of said aperture and a collar portion extending axially from said flange portion to act as a mounting site for cooperating structure means; and a thick-walled sleeve bearing of sintered iron material fixed in said cylindrical portion.

4. A sheave arrangement comprising: pulley means having a peripheral rim, a central aperture and an annular region intermediate said rim and said aperture; force-transmitting pin means fastened to said annular region including elongate portions extending axially outwardly from said pulley means to be engaged by motive means; one-piece hub means, including a cylindrical portion received in said aperture, a flange portion radiating from said cylindrical portion to abut said pulley means radially outwardly of said aperture and a collar portion extending axially from said flange portion to act as a mounting site for cooperating structure means; and sleeve-bearing means fixed in said cylindrical portion.

5. A sheave arrangement according to claim 2 wherein the inner edge portions of said first and second sheet material members have mutually abutting surfaces aligned axially with the flange portion of said hub means and wherein said sheave arrangement further includes attachment means connecting said inner edge portions and said flange portion to form a triple-layer laminated region surrounding said central aperture.

References Cited by the Examiner

UNITED STATES PATENTS

| | | | |
|---|---|---|---|
| 2,738,681 | 3/1956 | Schultz | 74—230.8 X |
| 2,787,165 | 4/1957 | Schultz | 74—230.3 |

DAVID J. WILLIAMOWSKY, *Primary Examiner.*

L. H. GERIN, *Assistant Examiner.*